(12) United States Patent
Yasue et al.

(10) Patent No.: US 8,095,263 B2
(45) Date of Patent: Jan. 10, 2012

(54) ELECTRONIC CONTROL UNIT AND VEHICLE CONTROL SYSTEM

(75) Inventors: Motohiro Yasue, Chiryu (JP); Kokichi Shimizu, Kariya (JP); Kazunori Okada, Chiryu (JP)

(73) Assignee: Denso Corporation, Kariya (JP)

( * ) Notice: Subject to any disclaimer, the term of this patent is extended or adjusted under 35 U.S.C. 154(b) by 353 days.

(21) Appl. No.: 12/418,888

(22) Filed: Apr. 6, 2009

(65) Prior Publication Data

US 2009/0271063 A1    Oct. 29, 2009

(30) Foreign Application Priority Data

Apr. 23, 2008    (JP) ................................. 2008-112684

(51) Int. Cl.
G06F 19/00    (2011.01)
(52) U.S. Cl. ............ 701/32; 701/35; 701/114; 340/3.42
(58) Field of Classification Search .................. 701/29, 701/32, 33, 35, 114, 115; 340/3.42
See application file for complete search history.

(56) References Cited

U.S. PATENT DOCUMENTS

| 5,479,347 | A | | 12/1995 | Oguro et al. | |
|---|---|---|---|---|---|
| 5,964,813 | A | | 10/1999 | Ishii et al. | |
| 6,125,309 | A | * | 9/2000 | Fujimoto | 701/1 |
| 6,243,627 | B1 | | 6/2001 | Ozeki | |
| 7,068,147 | B2 | * | 6/2006 | Suganuma et al. | 340/5.74 |
| 7,865,281 | B2 | * | 1/2011 | Iwai et al. | 701/35 |
| 2009/0281689 | A1 | * | 11/2009 | Suganuma et al. | 701/35 |
| 2010/0299023 | A1 | * | 11/2010 | Okada | 701/35 |

FOREIGN PATENT DOCUMENTS

| JP | 07-281962 | 10/1995 |
|---|---|---|
| JP | 10-063542 | 3/1998 |
| JP | 2000-185606 | 7/2000 |
| JP | 2008-185606 | 7/2000 |
| JP | 2001-301572 | 10/2001 |
| JP | 2003-002132 | 1/2003 |
| JP | 2004-306624 | 11/2004 |
| JP | 2006-063939 | 3/2006 |
| JP | 2006-232213 | 9/2006 |

OTHER PUBLICATIONS

Japanese Office Action dated Feb. 16, 2010, issued in corresponding Japanese Application No. 2008-112684, with English translation.
§ 1968.2 Malfunction and Diagnostic System Requirements-2004 and Subsequent Model-Year Passenger Cars, Light-Duty Trucks, and Medium-Duty Vehicles and Engines, pp. 1-143.

* cited by examiner

*Primary Examiner* — Paul N Dickson
*Assistant Examiner* — Timothy Wilhelm
(74) *Attorney, Agent, or Firm* — Nixon & Vanderhye P.C.

(57) ABSTRACT

When an electronic control unit receives a rewriting request of vehicle identification information, the electronic control unit writes state information indicating a rewriting state in a memory and rewrites the vehicle identification information into new vehicle identification information. The electronic control unit sends an erasing order to a peripheral electronic unit for erasing failure information stored in the peripheral electronic unit and determines whether the peripheral electronic control unit sends an erasing completion signal indicating that the erasing of the failure information is completed. The electronic control unit erases the state information indicating the rewriting state when the rewriting of the vehicle identification information is completed and the peripheral electronic control unit sends the erasing completion signal.

26 Claims, 7 Drawing Sheets

ELECTRONIC CONTROL UNIT AND VEHICLE CONTROL SYSTEM

CROSS REFERENCE TO RELATED APPLICATIONS

The present application is based on and claims priority to Japanese Patent Application No. 2008-112684 filed on Apr. 23, 2008, the contents of which are incorporated in their entirety herein by reference.

BACKGROUND OF THE INVENTION

1. Field of the Invention

The present invention relates to an electronic control unit for storing vehicle identification information and a vehicle control system including the electronic control unit.

2. Description of the Related Art

Conventionally, a vehicle control system includes electronic control unit (ECU) for controlling various parts of a vehicle. In the ECU, a vehicle identification code (VIN code) unique to each vehicle is stored in a nonvolatile memory to be readable and writable as described, for example, in JP-A-2001-301572. When the ECU is remounted on another vehicle, the VIN code is rewritten. The VIN code is used for identifying the vehicle, for example, when the vehicle is repaired at a dealer. The identification of the vehicle is required for treating the vehicle in the most suitable way.

A stage II of on-board diagnostics regulation (OBD-II regulation) by the California Air Resources Board (CARB) stipulates that failure information of the vehicle is to be stored in a nonvolatile memory. Thus, the failure information is stored in the nonvolatile memory in the ECU. The nonvolatile memory includes, for example, standby random access memory (SRAM) and electrically erasable programmable read-only memory (EEPROM).

The OBD-II regulation further stipulates that all failure information related to emission is to be erased when the VIN code is rewritten. Thus, the emission-related failure information is required to be erased each time when the VIN code in the ECU is rewritten.

In an exemplary method of the conventional art, after the VIN code is rewritten, a failure information erasing order is input from peripheral tool to the ECU. However, in a case where a power switch of the ECU is turned off or the ECU is reset during the erasing of the failure information, the failure information may remain in the ECU.

SUMMARY OF THE INVENTION

In view of the foregoing problems, it is an object of the present invention to provide an ECU for storing a VIN code unique to a vehicle. Another object of the present invention is to provide a vehicle control system including the ECU.

An ECU according to a first aspect of the present invention is provided in a vehicle and configured to be coupled with a peripheral ECU for storing failure information of the vehicle. The ECU stores vehicle identification information unique to the vehicle. The ECU rewrites the vehicle identification information into new vehicle identification information when the ECU receives a rewriting request of the vehicle identification information. The ECU includes a memory configured to store data regardless of an on-off state of a power source of the ECU. The ECU writes state information in the memory. The state information indicates a state of rewriting the vehicle identification information. The ECU sends an erasing order to the peripheral ECU when the state information stored in the memory indicates a rewriting state so as to control the peripheral ECU to erase the failure information. The ECU determines whether the peripheral ECU sends an erasing completion signal. The erasing completion signal indicates that the erasing of the failure information in the peripheral ECU is completed. The ECU writes the state information indicating the rewriting state in the memory when the ECU receives the rewriting request. The ECU erases the state information indicating the rewriting state when the ECU completes the rewriting of the vehicle identification information and the ECU determines that the peripheral ECU sends the erasing completion signal. The present ECU can erase the failure information in the peripheral ECU with high certainty.

A vehicle control system according to a second aspect of the present invention is provided in a vehicle. The vehicle control system includes a first ECU and a second ECU. The second ECU is configured to store failure information of the vehicle and is coupled with the first ECU. The first ECU stores vehicle identification information unique to the vehicle. The first ECU rewrites the vehicle identification information into new vehicle identification information when the first ECU receives a rewriting request of the vehicle identification information. The first ECU includes a memory configured to store data regardless of an on-off state of a power source of the first ECU. The first ECU writes state information in the memory. The state information indicates a state of rewriting the vehicle identification information. The first ECU sends an erasing order to the second ECU when the state information stored in the memory indicates a rewriting state so as to control the second ECU to erase the failure information. The first ECU determines whether the second ECU sends an erasing completion signal. The erasing completion signal indicates that the erasing of the failure information in the second ECU is completed. The first ECU writes the state information indicating the rewriting state in the memory when the first ECU receives the rewriting request. The first ECU erases the state information indicating the rewriting state when the first ECU completes the rewriting of the vehicle identification information and the first ECU determines that the second ECU sends the erasing completion signal. In the present vehicle control system, the first ECU can erase the failure information in the second ECU with certainty.

An ECU according to a third aspect of the present invention is provided in a vehicle. The ECU stores identification information unique to the vehicle and failure information of the vehicle. The ECU rewrites the vehicle identification information into new vehicle identification information when the ECU receives a rewriting request of the vehicle identification information. The ECU erases the failure information when the ECU rewrites the vehicle identification information. The ECU stores a history of the vehicle identification information. The ECU determines whether the new vehicle identification information is same as vehicle identification information stored before. The ECU does not rewrites the vehicle identification information stored in the storing means into the new vehicle identification information when the ECU determines that the new vehicle identification information is same as the vehicle identification information stored before. The present ECU can restrict an act of erasing the failure information dishonestly by once rewriting the regular vehicle identification information into different vehicle identification information and rewriting the different vehicle identification information into the regular vehicle identification information again.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

Before describing exemplary embodiments of the present invention, exemplary aspects of the present invention will be described below.

An ECU according to a first aspect of the present invention is disposed in a vehicle and is coupled with a peripheral ECU for storing failure information in the vehicle. The ECU includes storing means for storing vehicle identification information unique to the vehicle and rewriting means for rewriting the vehicle identification information stored in the storing means into new vehicle identification information when the rewriting means receive a rewriting request. The storing means includes a nonvolatile memory such as, for example, EEPROM.

The ECU further includes a memory configured to store data regardless of an on-off state of a power source and state information control means for writing state information in the memory. The state information indicates a state of rewriting the vehicle identification information. The memory includes, for example, an SRAM or a nonvolatile memory such as EEPROM. The SRAM is applied with electricity from a battery of the vehicle and can store data unless the battery is disconnected. The vehicle identification information and the state information may be stored in the same nonvolatile memory.

The ECU further includes erasing order sending means and determining means. The erasing order sending means sends erasing order to the peripheral ECU when the state information stored in the memory indicates a rewriting state so as to control the peripheral ECU to erase the failure information. The determining means determines whether the peripheral ECU sends an erasing completion signal. The erasing completion signal indicates that the failure information in the peripheral ECU is erased. The erasing order sending means may send the erasing order periodically when the state information indicating the rewriting state is stored in the memory. Alternatively, the erasing order sending means may send the erasing order when the ECU is activated.

The state information control means writes the state information indicating the rewriting state in the memory when the rewriting means receives the rewriting request and the rewriting means starts to rewrite the vehicle identification information. The state information control means includes determination erasing means. The determination erasing means erases the state information indicating the rewriting state when the rewriting means completes the rewriting of the vehicle identification information and the determining means determines that the peripheral ECU sends the erasing completion signal. When the state information indicating the rewriting state is erased, the state information indicating the rewriting state may be rewritten into another state information, for example, indicating the completion of the rewriting.

In the ECU according to the first aspect, the state information indicating the rewriting state remains in the memory even if a power source of the peripheral ECU is turned off or the peripheral ECU is reset during the erasing of the failure information. Thus, the ECU can send the erasing order based on the state information stored in the memory. Thereby, the peripheral ECU can restart to erase the failure information. As a result, the failure information can be erased with certainty.

The state information indicating the rewriting state may be stored before the rewriting means start to rewrite the vehicle identification information. In such a case, even if the power source of the ECU is turned off or the ECU is reset during the rewriting of the vehicle identification information or just after the rewriting of the vehicle identification information is completed, the state information indicating the rewriting state remains in the memory. Thus, the ECU can send the erasing order based on the state information stored in the memory, and thereby the failure information can be erased with certainty.

As described above, in the ECU according to the first aspect, even if the power source of the ECU is turned off or the ECU is reset before the erasing of the failure information is completed, the peripheral ECU can restart to erase the failure information after the power source is turned or the ECU is reset. Thus, the ECU can prevent remain of the failure information when the vehicle identification information is rewritten.

The ECU according to the first aspect may further include failure information storing means for storing the failure information. The storing means may erase the failure information stored therein when the state information stored in the memory indicates the rewriting state and the determining means may further determine whether the failure information stored in the failure information storing means is erased. The determination erasing means may erase the state information indicating the rewriting state when the determining means determines that the peripheral ECU sends the erasing completion signal and the failure information stored in the failure information storing means is erased.

In such a case, the state information indicating the rewriting state is not erased until the failure information stored in the peripheral ECU and the failure information stored in the failure information storing means are erased. When the state information indicating the rewriting state is stored in the memory, the erasing order sending means sends the erasing order to the peripheral ECU so as to control the peripheral ECU to erase the failure information stored in the peripheral ECU. In addition, the failure information stored in failure information storing means is erased. Thus, the failure information stored in the peripheral ECU and the failure information stored in the failure information storing means can be erased with certainty when the vehicle identification information is rewritten.

The ECU according to the first aspect may further include completion erasing means. The completion erasing means erases the state information indicating the rewriting state when the rewriting means completes the rewriting of the vehicle identification information regardless of a determination result of the determination means.

In such a case, the erasing order is sent to the peripheral ECU as long as the state information indicating the rewriting state is stored in the memory. Thus, the failure information can be erased with certainty. In addition, because the state information indicating the rewriting state is erased when the rewriting of the vehicle identification information is completed regardless of whether the peripheral ECU sends the erasing completion signal, a configuration of the ECU can be simplified. Specifically, the determination of whether the peripheral ECU sends the erasing completion signal or the determining means can be omitted.

Thus, in such a case, the ECU includes storing means for storing vehicle identification information unique to a vehicle, rewriting means for rewriting the vehicle identification information stored in the storing means into new vehicle identification information when the rewriting means receives a rewriting request of the vehicle identification information, a memory configured to store data regardless of an on-off state of a power source of the ECU, state information control means for writing state information in the memory, the state information indicating a state of rewriting the vehicle identification information, and erasing order sending means for sending an erasing order to a peripheral ECU when the state information stored in the memory indicates the rewriting state so as to control the peripheral ECU to erase failure information stored in the peripheral ECU. The state information control means writes the state information in the memory when the rewriting means receives the rewriting request. The state information control means erases the state information indicating the rewriting state when the rewriting means completes the rewriting of the vehicle identification information.

The ECU according to the first aspect may further include history storing means for storing a history of the vehicle identification information stored in the storing means, history determining means for determining whether vehicle identification information same as the new vehicle identification information is stored in the history storing means, and prohibiting means for prohibiting the rewriting means from rewriting the vehicle identification information stored in the storing means into the new vehicle identification information when the history determining means determines that vehicle identification information same as the new vehicle identification information is stored in the history storing means. The history storing means includes a nonvolatile memory such as, for example, EEPROM. For example, the nonvolatile memory may have storage area for storing the history.

In such a case, vehicle identification information once stored in the storing means cannot be written in the storing means again. Thus, the ECU can prevent an act of erasing the failure information dishonestly by once rewriting regular vehicle identification information into different vehicle identification information and rewriting the different vehicle identification information into the regular vehicle identification information again.

The ECU may be configured so that the rewriting means is capable of rewriting the vehicle identification information a predetermined number of times. The ECU may further include failure information storing means having a plurality of storage areas for storing the failure information, storage area selecting means for selecting one of the storage areas in order each time the rewriting means rewrites the vehicle identification information, and failure information storage control means for writing the failure information in the storage area selected by the storage area selecting means. The number of the storage areas may be same as the predetermined number.

In such a case, the storage area in which the failure information is written is changed each time the vehicle identification information is rewritten. Thus, the failure information storage control means starts to write the failure information in new storage area selected by the storage area selecting means when the vehicle identification number is rewritten. Thereby, in such a configuration, it is not required for erasing all the failure information when the vehicle identification information is rewritten. Therefore, a process load and a process time can be reduced.

The ECU according to the first aspect may further include code information generating means for generating code information unique to the vehicle identification information from the vehicle identification information stored in the storing means by a predetermined calculating process, input means for inputting information based on an operation by a user, verification means for determining whether the code information generated from the vehicle identification information corresponds to the information input by the user through the input means, and rewriting prohibiting means for prohibiting the rewriting means from rewriting the vehicle identification information into the new vehicle identification information when the verification means determines that the code information generated from the vehicle identification information is different from the information input through the input means.

In such a case, if a person trying to rewrite the vehicle identification information does not know the code information unique to the vehicle identification information stored in the storing means, the person cannot rewrite the vehicle identification information. Thus, the ECU can prevent the third parities from rewriting the vehicle identification information and erasing the failure information dishonestly.

The ECU may be configured so that the rewriting means is capable of rewriting the vehicle identification information unlimited times as long as the verification means determines that the code information generated from the vehicle identification information corresponds to the information input by the user through the input means.

A vehicle control system according to a second aspect of the present invention includes a first ECU and a second ECU. The second ECU is configured to store failure information of the vehicle and is coupled with the first ECU.

The first ECU includes storing means for storing vehicle identification information unique to the vehicle, rewriting means for rewriting the vehicle identification information into new vehicle identification information when the rewriting means receives a rewriting request of the vehicle identification information, a memory configured to store data regardless of an on-off state of a power source of the first ECU, state information control means for writing state information in the memory, the state information indicating a state of rewriting the vehicle identification information, erasing order sending means for sending an erasing order to the second ECU when the state information stored in the memory indicates a rewriting state so as to control the second ECU to erase the failure information, and determining means for determining whether the second ECU sends an erasing completion signal indicating that the erasing of the failure information in the second ECU is completed. The state information control means writes the state information indicating the rewriting state in the memory when the rewriting means receives the rewriting request. The state information control means includes determination erasing means for erasing the state information indicating the rewriting state when the rewriting means completes the rewriting of the vehicle identification information and the determining means determines that the second electronic control unit sends the erasing completion signal.

In the vehicle control system, the failure information stored in the second ECU can be erased with certainty when the first ECU rewrites the vehicle identification information.

In the vehicle control system according to the second aspect, the first ECU may further include failure information storing means for storing the failure information. The failure information storing means is configured to erase the failure information when the state information stored in the memory indicates the rewriting state. The determining means may further determine whether the failure information stored in the failure information storing means is erased when the state information stored in the memory indicates the rewriting state. The determination erasing means may erase the state information indicating the rewriting state when the determining means determines that the second ECU sends the erasing completion signal and the failure information stored in the failure information storing means is erased in a state where the rewriting means completes the rewriting of the vehicle identification information.

In such a case, the failure information stored in the failure information storing means in the first ECU and the failure information stored in the second ECU can be erased with certainty when the vehicle identification information is rewritten.

In the vehicle control system according to the second aspect, the state information control means may further include completion erasing means for erasing the state information indicating the rewriting state when the rewriting means completes the rewriting of the vehicle identification information regardless of a determination result of the determining means.

In such a case, the erasing order is sent to the second ECU as long as the state information indicating the rewriting state is stored in the memory. Thus, the failure information can be erased with certainty. In addition, because the state information indicating the rewriting state is erased when the rewriting of the vehicle identification information is completed regardless of whether the second ECU sends the erasing completion signal, a configuration of the ECU can be simplified. Specifically, the determination of whether the second ECU sends the erasing completion signal or the determining means can be omitted.

In the vehicle control system according to the second aspect, the first ECU may further include history storing means for storing a history of the vehicle identification information stored in the storing means, history determining means for determining whether vehicle identification information same as the new vehicle identification information is stored in the history storing means, and prohibiting means for prohibiting the rewriting means from rewriting the vehicle identification information stored in the storing means into the new vehicle identification information when the history determining means determines that vehicle identification information same as the new vehicle identification information is stored in the history storing means.

In such a case, the vehicle control system can prevent an act of erasing the failure information dishonestly by once rewriting the regular vehicle identification information into different vehicle identification information and rewriting the different vehicle identification information into the regular vehicle identification information again.

In the vehicle control system according to the second aspect, the first ECU may be configured so that the rewriting means is capable of rewriting the vehicle identification number a predetermined number of times. The first ECU may further include failure information storing means having a plurality of storage areas for storing the failure information, storage area selecting means for selecting one of the storage areas in order each time the rewriting means rewrites the vehicle identification information, and failure information storage control means for writing the failure information in the storage area selected by the storage area selecting means. The number of the storage areas may be same as the predetermined number.

In such a case, the failure information storage control means starts to write the failure information in new storage area selected by the storage area selecting means when the vehicle identification number is rewritten. Thereby, in such a configuration, it is not required for erasing all the failure information when the vehicle identification information is rewritten. Therefore, a process load and a process time can be reduced.

In the vehicle control system according to the second aspect, the first ECU may further include code information generating means for generating code information unique to the vehicle identification information from the vehicle identification information stored in the storing means by a predetermined calculating process, input means for inputting information based on an operation by a user, verification means for determining whether the code information generated from the vehicle identification information corresponds to the information input by the user through the input means, and rewriting prohibiting means for prohibiting the rewriting means from rewriting the vehicle identification information into the new vehicle identification information when the verification means determines that the code information generated from the vehicle identification information is different from the information input through the input means.

In such a case, if a person trying to rewrite the vehicle identification information does not know the code information unique to the vehicle identification information stored in the storing means, the person cannot rewrite the vehicle. Thus, the vehicle control system can prevent the third parities from rewriting the vehicle identification information and erasing the failure information dishonestly.

As described above, the OBD-II regulation stipulates that all failure information related to emission is to be erased when a VIN code is rewritten. If the failure information is automatically erased when the VIN code is rewritten, there is a possibility that the emission-related failure information is erased dishonestly by rewriting the VIN code.

In addition, there is a possibility in the future that a permanent fault code stored in a nonvolatile memory is to be erased when the VIN code is rewritten. In such a case, there is a possibility that the permanent fault code is erased dishonestly by rewriting the VIN code. The regulation stipulates that the permanent fault code is to be stored in the nonvolatile memory until it is determined that a fault indicated by the permanent fault code is normally restored.

In view of such circumstances, it is required to prevent an act of erasing the failure information dishonestly by rewriting the VIN code.

An ECU according to a third aspect of the present invention include storing means for storing vehicle identification information unique to the vehicle, failure information storing means for storing failure information of the vehicle, rewriting means for rewriting the vehicle identification information into new vehicle identification information when the rewriting means receives a rewriting request of the vehicle identification information, erasing means for erasing the failure information in the failure information storing means when the rewriting means rewrites the vehicle identification information, history storing means for storing a history of the vehicle identification information stored in the storing means, history determining means for determining whether vehicle identification information same as the new vehicle identification information is stored in the history storing means, and prohibiting means for prohibiting the rewriting means from rewriting the vehicle identification information stored in the storing means into the new vehicle identification information when the history determining means determines that vehicle identification information same as the new vehicle identification information is stored in the history storing means.

In the ECU, the vehicle identification information once stored in the storing means cannot be stored in the storing means again. Thus, the ECU can prevent act of once rewriting regular vehicle identification information into different vehicle identification information and rewriting the different vehicle identification into the regular vehicle identification information again. That is, the ECU can prevent an act of erasing the failure information dishonestly by once rewriting the regular vehicle identification information into different vehicle identification information and rewriting the different vehicle identification information into the regular vehicle identification information again.

In such a case, there is a possibility that the failure information is erased dishonestly by rewriting the regular vehicle identification information into different vehicle identification information. However, the different vehicle identification information cannot be rewritten into the regular vehicle identification information. Thus, the ECU can restrict an act of erasing the failure information dishonestly by rewriting the regular vehicle identification information into different identification information.

The ECU according to the third aspect may be configured to be coupled with a peripheral ECU for storing failure information. The ECU may further include erasing order sending means for sending an erasing order to the peripheral electronic control unit when the rewriting means rewrites the vehicle identification information so as to control the peripheral electronic control unit to erase the failure information.

In such a case, the ECU can prevent an act of dishonestly erasing the failure information stored in the peripheral ECU.

The ECU according to the third aspect may be configured so that the rewriting means is capable of rewriting the vehicle identification information a predetermined number of times The ECU may further include failure information storing means having a plurality of storage areas for storing the failure information, storage area selecting means for selecting one of the storage areas in order each time the rewriting means rewrites the vehicle identification information, and failure information storage control means for writing the failure information in the storage area selected by the storage area selecting means. The number of the storage areas may be same as the predetermined number.

In such a case, it is not required for erasing all the failure information when the vehicle identification information is rewritten. Therefore, a process load and a process time can be reduced.

The ECU according to the third aspect may further include code information generating means for generating code information unique to the vehicle identification information from the vehicle identification information stored in the storing means by a predetermined calculating process, input means for inputting information based on an operation by a user, verification means for determining whether the code information generated from the vehicle identification information corresponds to the information input by the user through the input means, and rewriting prohibiting means for prohibiting the rewriting means from rewriting the vehicle identification information into the new vehicle identification information when the verification means determines that the code information generated from the vehicle identification information is different from the information input through the input means. In such a case, the ECU can prevent the third parities from rewriting the vehicle identification information and erasing the failure information dishonestly.

Next, exemplary embodiments of the present invention will be described below.

First Embodiment

Figure 1:
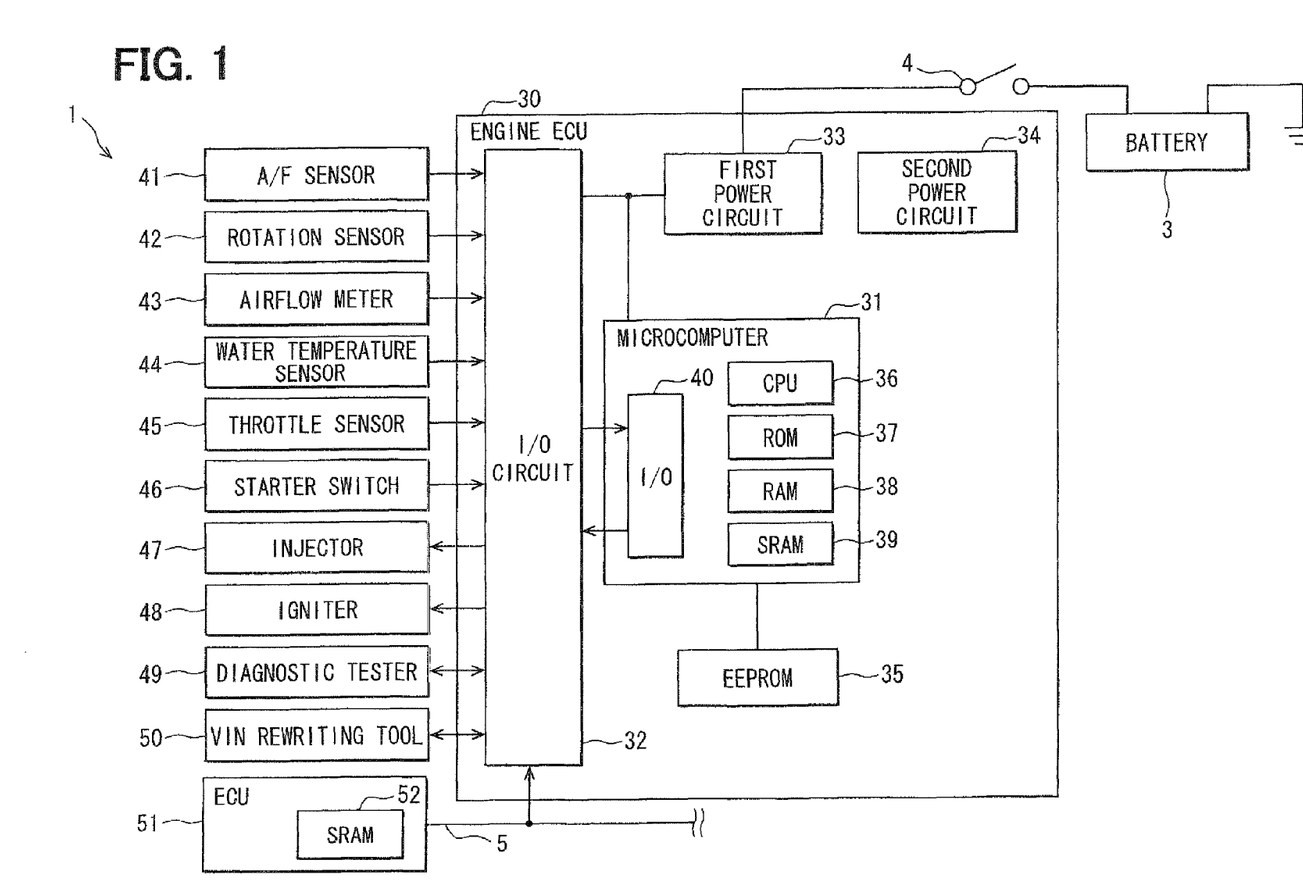
FIG. 1 is a block diagram illustrating an exemplary vehicle control system according to a first embodiment of the present invention.

A vehicle control system 1 according to a first embodiment of the present invention includes an electronic control unit (Engine ECU) 30 for controlling an engine of a vehicle, as illustrated in FIG. 1.

The engine ECU 30 includes a microcomputer 31, a first power circuit 33, a second power circuit 34, and an EEPROM 35 as a nonvolatile memory. The engine ECU 30 is coupled with a communication line 5 of the vehicle through an input/output circuit (I/O circuit) 32.

The communication line 5 is coupled with an electronic control unit (ECU) 51. The engine ECU 30 is capable of communicating with the ECU 51. The ECU 51 is a power train electronic control unit, for example, for controlling an automatic transmission.

The engine ECU 30 receives signals from various sensors through the I/O circuit 32. The vehicle includes an air-fuel ratio sensor (A/F sensor) 41 for detecting an air-fuel ratio, a rotation sensor 42 for detecting a rotation number of the engine, an airflow meter 43 for detecting an intake air amount, a water temperature sensor 44 for detecting a temperature of cooling water, a throttle sensor 45 for detecting an opening degree of a throttle, and starter switch 46 for activating the engine. Each of the A/F sensor 41, the rotation sensor 42, the airflow meter 43, the water temperature sensor 44, the throttle sensor 45, and the starter switch 46 outputs a signal to the microcomputer 31 through the I/O circuit 32.

Based on the signals input through the I/O circuit 32, the engine ECU 30 outputs control signals to an injector 47 for injecting fuel into a cylinder of the engine and an igniter 48 for igniting. Thereby the engine ECU 30 controls a drive of the engine.

The engine ECU 30 is capable of being coupled with a diagnostic tester 49 for diagnosing failure. When the engine ECU 30 receives a request signal from the diagnostic tester 49, the engine ECU 30 outputs failure information to the diagnostic tester 49. The failure information is stored, for example, in an SRAM 39 in the microcomputer 31.

In addition, the engine ECU 30 is capable of being coupled with a VIN rewriting tool 50 for rewriting a vehicle identification code (VIN code) unique to the vehicle. Next, exemplary components of the engine ECU 30 will be described.

The microcomputer 31 includes a central processing unit (CPU) 36, a read-only memory (ROM) 37, a random-access memory (RAM) 38, the SRAM 39, and an input/output part (110 part) 40. The CPU 36 operates in accordance with a program. The ROM 37 stores the program performed by the CPU 36 and data referred by the CPU 36. The RAM 38 stores, for example, a calculation result of the CPU 36. The SRAM 39 is supplied with electricity from a battery 3 loaded in the vehicle. Even when the ignition switch 4 is turned off, the SRAM 39 is capable of storing data. The I/O part 40 is capable of exchanging data with a peripheral circuit including the I/O circuit 32. The SRAM 39 stores the failure information including emission-related failure information.

The first power circuit 33 is supplied with a battery voltage of, for example, about 12 V from the battery 3 when the ignition switch 4 is in on-state. The first power circuit 33 steps down the battery voltage to, for example, about 5V and supplies the voltage to the microcomputer 31 and the I/O circuit 32.

The second power circuit 34 is supplied with a voltage from the battery 3 even when the ignition switch 4 is in off-state and supplies a predetermined voltage to the microcomputer 31. Thereby, the data stored in the SRAM 39 can be stored even after the ignition switch 4 is turned off.

The EEPROM 35 stores at least the VIN code. For example, the VIN code may be determined in an assembling process of the vehicle. In such a case, the VIN rewriting tool 50 is coupled with the ECU 30 in the assembling process and the VIN rewriting tool 50 writes the VIN code in the EEPROM 35. The VIN code is rewritable. However, a rewritable number of times is predetermined. The EEPROM 35 further stores a permanent fault code.

The ECU 51 includes an SRAM 52. The SRAM 52 stores the failure information including the emission-related failure information. Each of the engine ECU 30 and the ECU 51 has a unique identification data (ID) and stores the ID in a memory thereof. For example, the memory is a nonvolatile memory.

Figure 2:
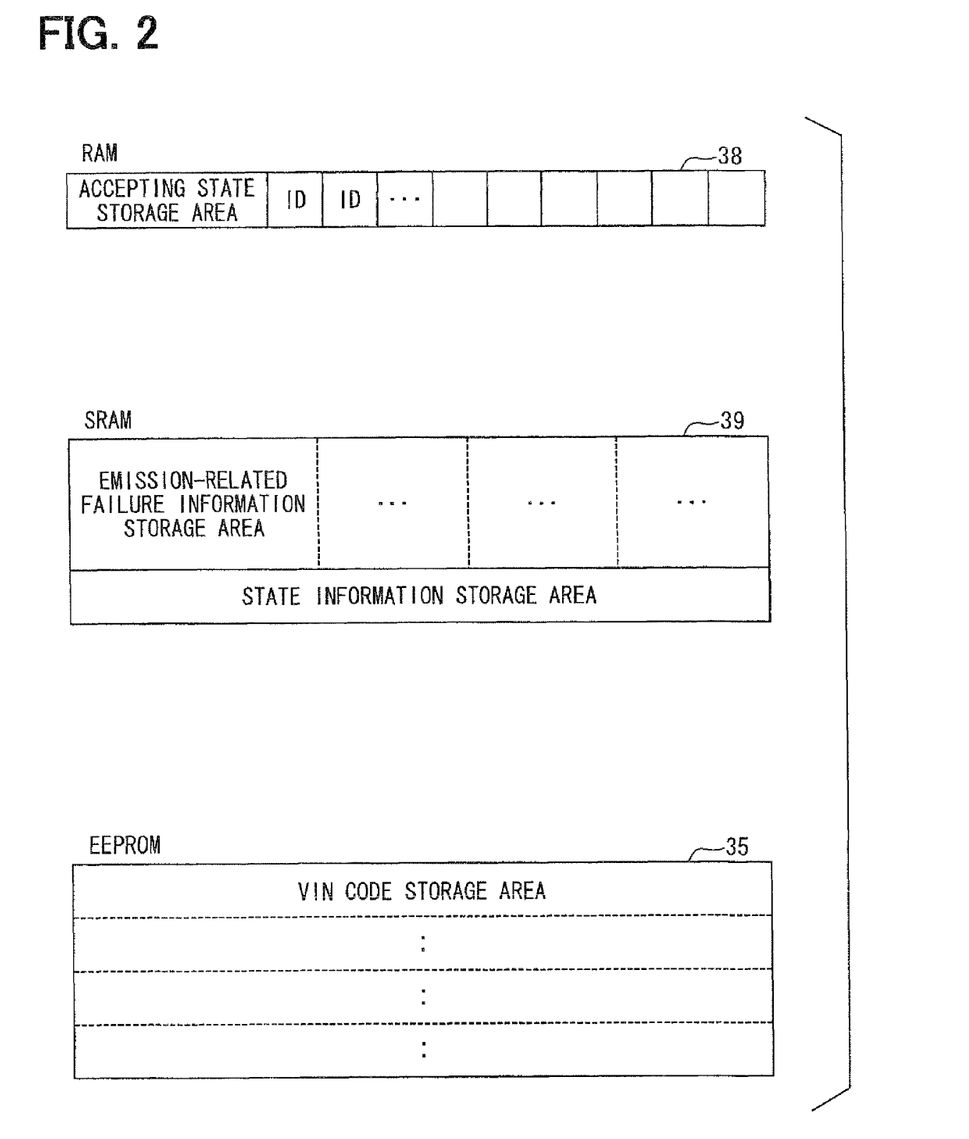
FIG. 2 is a diagram illustrating exemplary storage areas of a RAM, an SRAM, and an EEPROM in an engine ECU.

As illustrated in FIG. 2, the RAM 38 includes accepting state storage areas. The accepting state storage areas store IDs of ECUs including the engine ECU 30, the ECU 51, and other ECUs.

The SRAM 39 includes emission-related failure information storage areas. The number of the emission-related failure information storage areas is same as the rewritable number of times of the VIN code. The SRAM 39 further includes a state information storage area. In the OBD-II regulation, the emission-related failure information is required to be erased when the VIN code is rewritten.

The state information includes information of a state of rewriting VIN-code stored in EEPROM 35 and information of a state of erasing failure information. The state information indicates that the present state is a non-request state or a renewing state. In the non-request state, the VIN code is not being rewritten. That is, the non-request state is a state before rewriting the VIN code and a state where the rewriting of the VIN code has been completed. The state where the rewriting of the VIN code has been completed means that the erasing of failure information to be erased has been completed. In the renewing state, the VIN code is being rewritten and the failure information is being erased.

The EEPROM 35 includes VIN code storage areas. The VIN code storage area stores the VIN code unique to the vehicle. The number of the VIN code storage areas is same as the rewritable number of times of the VIN code. In the present embodiment, when the VIN code is newly written or rewritten, the new VIN code is stored at the VIN code storage area having a top address. The old VIN code is stored in the VIN code storage area having a lower address. That is, in the present embodiment, the old VIN code remains. A section for storing the permanent fault code is not illustrated in FIG. 2.

An exemplary process performed by the CPU 36 in the microcomputer 31 will be described with reference to a flowchart in FIG. 3. The process may be executed at a predetermined cycle. Alternatively, the process may be executed when a predetermined event is detected.

At S110, the CPU 36 determines whether the state information stored in the state information storage area indicates the non-request state. If the CPU 36 determines that the state information indicates the non-request state, which corresponds to YES at S110, the process proceeds to S120. If the CPU 36 determines that the state information does not indicate the non-request state, that is, the state information indicates the renewing state, which corresponds to NO at S110, the process proceeds to S160.

At S120, the CPU 36 determines whether the CPU 36 receives a VIN code rewriting request. If the CPU 36 determines that the CPU 36 receives a VIN code rewriting request, which corresponds to YES at S120, the process proceeds to S130. The VIN code rewriting request is input from the VIN rewriting tool 50.

At S130, the CPU 36 determines whether the present rewriting is within the rewritable number of times. In addition, the CPU 36 determines whether the new VIN code to be written is different from old VIN codes stored before.

For example, when the rewritable number of times is four, the VIN code can be rewritten up to the fourth time. In such a case, the CPU 36 determines whether the present rewriting is less than or equal to the fourth time. In addition, the CPU 36 determines whether VIN code same as the new VIN code is stored in the VIN code storage areas in the EEPROM 35.

If the CPU 36 determines that the present rewriting is within the rewritable number of times and the new VIN code is different from the old VIN codes stored before, which corresponds to YES at S130, the process proceeds to S140.

If the CPU 36 determines that the present writing is over the rewritable number of times or if the CPU 36 determines that the new VIN code is same as one of the old VIN code stored before, which corresponds to NO at S130, the CPU 36 ends the process.

At S140, the CPU 36 accepts the VIN code rewriting request and the process proceeds to S150. At S150, the CPU 36 changes the state information in the SRAM 39 into the state information indicating the renewing state. At S160, the CPU 36 sends the state information indicating the renewing state to other ECUs including the ECU 51.

When the ECU 51 receives the state information indicating the renewing state, the ECU 51 sends a request accepting signal and the ID of the ECU 51 to the engine ECU 30. At S170, the CPU 36 receives the request accepting signal and the ID of the ECU 51 and writes the ID of the ECU 51 in the accepting state storage area in the RAM 38. When an ID is stored in the accepting state storage area, the CPU 36 determines that the CPU 36 receives the request accepting signal from an ECU corresponding to the ID and the CPU 36 does not receive erasing completion signal from the ECU.

At S180, the CPU 36 executes the rewriting of the VIN code. The new VIN code is input from the VIN rewriting tool 50 with the rewriting request. At S190, the failure information stored in the engine ECU 30 including the emission-related failure information stored in the SRAM 39 is erased.

At S200, the CPU 36 receives the erasing completion signal from the ECU 51. Then, the CPU 38 erases the ID of the ECU 51 stored in the accepting state storing area in the RAM 38.

At S210, the CPU 36 determines whether the failure information in all the ECUs including the engine ECU 30 and the ECU 51 is erased. The CPU 36 may determine whether the emission-related failure information in the engine ECU 30 is erased based on a determination of whether a process for erasing the emission-related failure information has been completed. Alternatively, the CPU 36 may determine whether the emission-related failure information in the engine ECU 30 is erased based on a determination of whether the emission-related failure information is stored in the emission-related failure information storage area. In such a case, the CPU 36 determines that the erasing has been completed if the emission-related failure information is not stored in the emission-related information storage area.

In addition, the CPU 36 may determine whether the erasing of the emission-related failure information in the ECU 51 has been completed based on a storing state of the accepting state storage area of the RAM 38. For example, when the ID of the ECU 51 is not stored in the accepting state storage area, the CPU 36 can determine that the CPU 36 has received the easing completion signal from the ECU 51. Thus, the CPU 36 can determine that the erasing of the emission-related failure information in the ECU 51 has been completed.

If the CPU 36 determines that the erasing of the failure information in all the ECUs has not been completed, that is, if the CPU 36 determines that the erasing of the failure information in at least one of the ECUs has not been completed, which corresponds to NO at S210, the process returns to S200.

If the CPU 36 determines that the erasing of the failure information in all the ECUs has been completed, which corresponds to YES at S210, the process proceeds to S220. At S220, the CPU 36 changes the state information stored in the SRAM 39 into that state information indicating the non-request state. Then, the process ends.

If the ECUs storing the failure information to be erased are identified, the engine CPU 36 may receive the erasing completion signal from all the identified ECU. Alternatively, one of the ECUs may send the erasing completion signal to the engine ECU 30 so as to inform the CPU 36 that the erasing of the failure information in all the ECU has been completed. At least, the CPU 36 determines whether the CPU 36 receives a notice from other ECU so that the CPU 36 can recognize a completion of a process for meeting the regulation.

Figure 3:
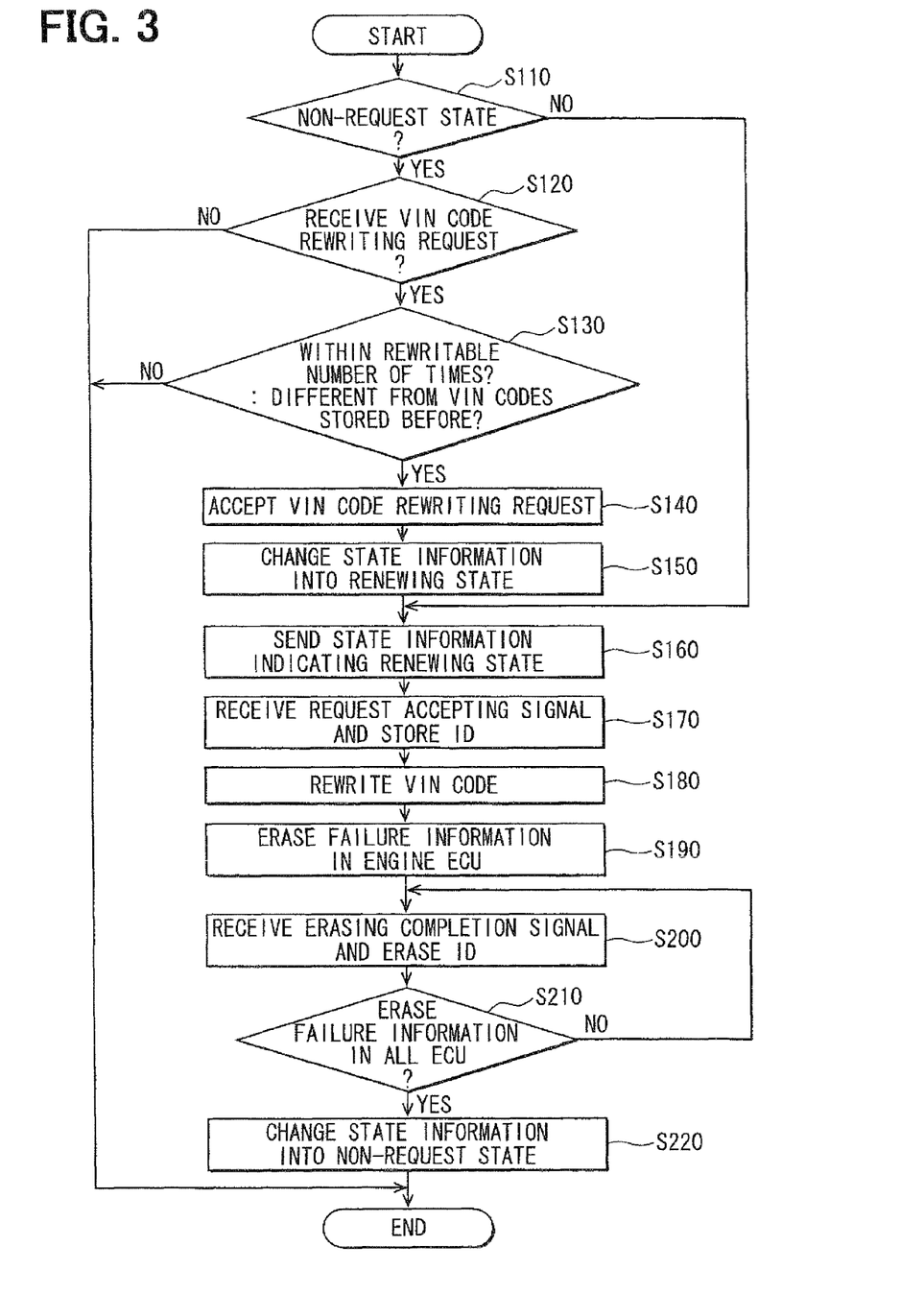
FIG. 3 is a flowchart illustrating an exemplary process performed by the engine ECU.

Even if the ignition switch 4 is turned off or the engine ECU 30 is reset by error during the process illustrated in FIG. 3, the CPU 36 determines that the state information does not indicate the non-request state at S110 if the state information indicating the renewing state is stored in the state information storage area in the SRAM 39. Then, at S160, the state information indicating the renewing state is sent to the ECUs including the ECU 51. In addition, at S190, the failure information in the engine ECU 30 is erased.

Figure 4:
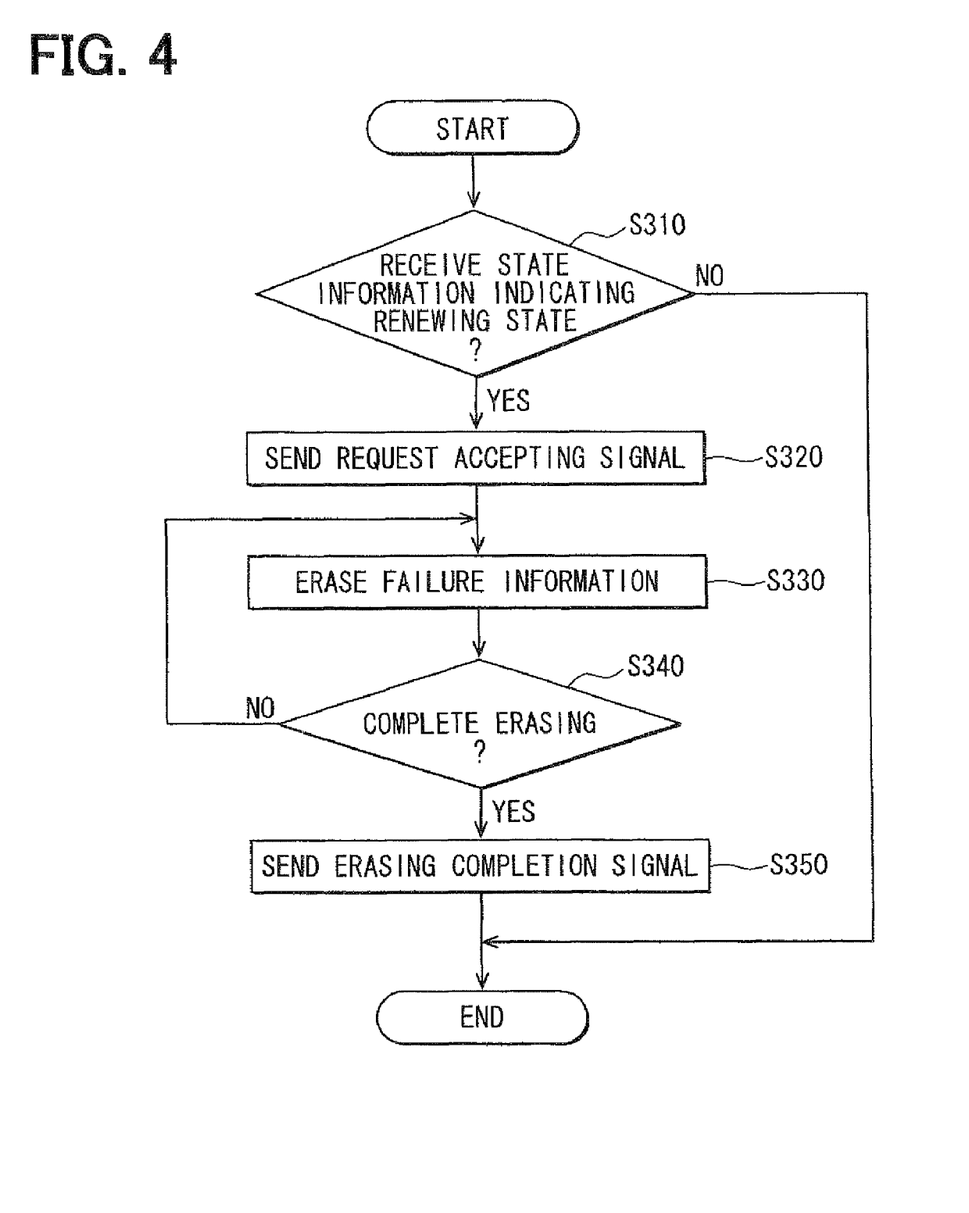
FIG. 4 is a flowchart illustrating an exemplary process performed by an ECU.

An exemplary process performed by a CPU (not shown) of a microcomputer in the ECU 51 will be described with reference to FIG. 4. The present process is executed periodically. At S310, the CPU determines whether the ECU 51 receives the state information indicating the renewing state from the engine ECU 30. If the CPU determines that the ECU 51 does not receive the state information indicating the renewing state, which corresponds to NO at S310, the process ends. The state information indicating the renewing state is sent from the engine ECU 30 at S160 in the process illustrated in FIG. 3.

If the CPU determines that the ECU 51 receives the state information indicating the renewing state, which corresponds to YES at S310, the process proceeds to S320. At S320, the ECU 51 sends the request accepting signal to the engine ECU 30.

At S330, the CPU erases the failure information stored in the ECU 51. The failure information includes the emission-related failure information. At S340, the CPU determines whether the erasing of the failure information has been completed. The CPU may determine whether the erasing of the failure information has been completed, for example, based on a determination of whether a process for erasing the failure information has been completed. Alternatively, the CPU may determine where the erasing of the failure information has been completed based on a determination of whether the failure information is stored in the SRAM 52. In such a case, the CPU determines that the erasing has been completed if the failure information is not stored in the storage area of the SRAM 52.

If the CPU determines that the erasing has been completed, which corresponds to YES at S340, the process proceeds to S350. At S3507 the ECU 51 sends the erasing completion signal to the engine ECU 30. Then, the process ends.

In the vehicle control system 1 according to the present embodiment, when the engine ECU 30 receives the VIN code rewriting request at S140, the engine ECU 30 erases the failure information stored in the engine ECU 30 at S190 and sends the state information indicating the renewing state to other ECUs including the ECU 51 at S160. Thereby, the failure information stored in the ECU 51 is erased at S330. Even if the ignition switch 4 is turned off or the engine ECU 30 is reset by error during the process, the erasing of the failure information is performed at S190 if the state information indicating the renewing state is stored in the engine ECU 30 at S110.

Thereby, the failure information to be erased can be erased with certainty when the VIN code is rewritten. In the OBD-II regulation of CARB, the emission-related failure information is required to be erased when the VIN code is rewritten. The vehicle control system 1 according to the present embodiment can comply with the regulation with certainty.

The process at S150 to S170 in FIG. 3 may be performed after the process at S180 where the VIN code is rewritten. In the vehicle control system 1 according to the present embodiment, when the CPU 36 determines the new VIN code is same as one of the VIN codes stored before, which corresponds to NO at S130, the process ends. That is, the VIN code once stored in the VIN code storage area in the EEPROM 35 cannot be stored again. Thus, the vehicle control system 1 can prevent act of once rewriting a regular VIN code into different VIN code and rewriting the different VIN code into the regular VIN code again. Thereby, the vehicle control system 1 can prevent an act of erasing the failure information dishonestly by once rewriting the regular VIN code into different VIN code and rewriting the different VIN code into the regular VIN code again.

In the vehicle control system 1 according to the present embodiment, the EEPROM 35 corresponds to the storing means and the history storing means. The SRAM 39 corresponds to the failure information storing means. The process at S180 corresponds to the rewriting means. The process at S150 and S220 correspond to the state information control means. Especially, the process at S220 corresponds to the determination erasing means. The process at S160 corresponds to the erasing order sending means. The process at S190 corresponds to the erasing means. For example, the state information indicating the renewing state and sent to the ECU 51 corresponds to the erasing order. The process at S210 corresponds to the determining means. The process at S130 corresponds to the history determining means. In a case where the CPU 36 determines that the new VIN code corresponds to one of the VIN codes stored before, at S130, the process ends. Such process corresponds to the prohibiting means. The emission-related failure information storage areas in the SRAM 39 correspond to the failure information storage area.

Second Embodiment

Figure 5:
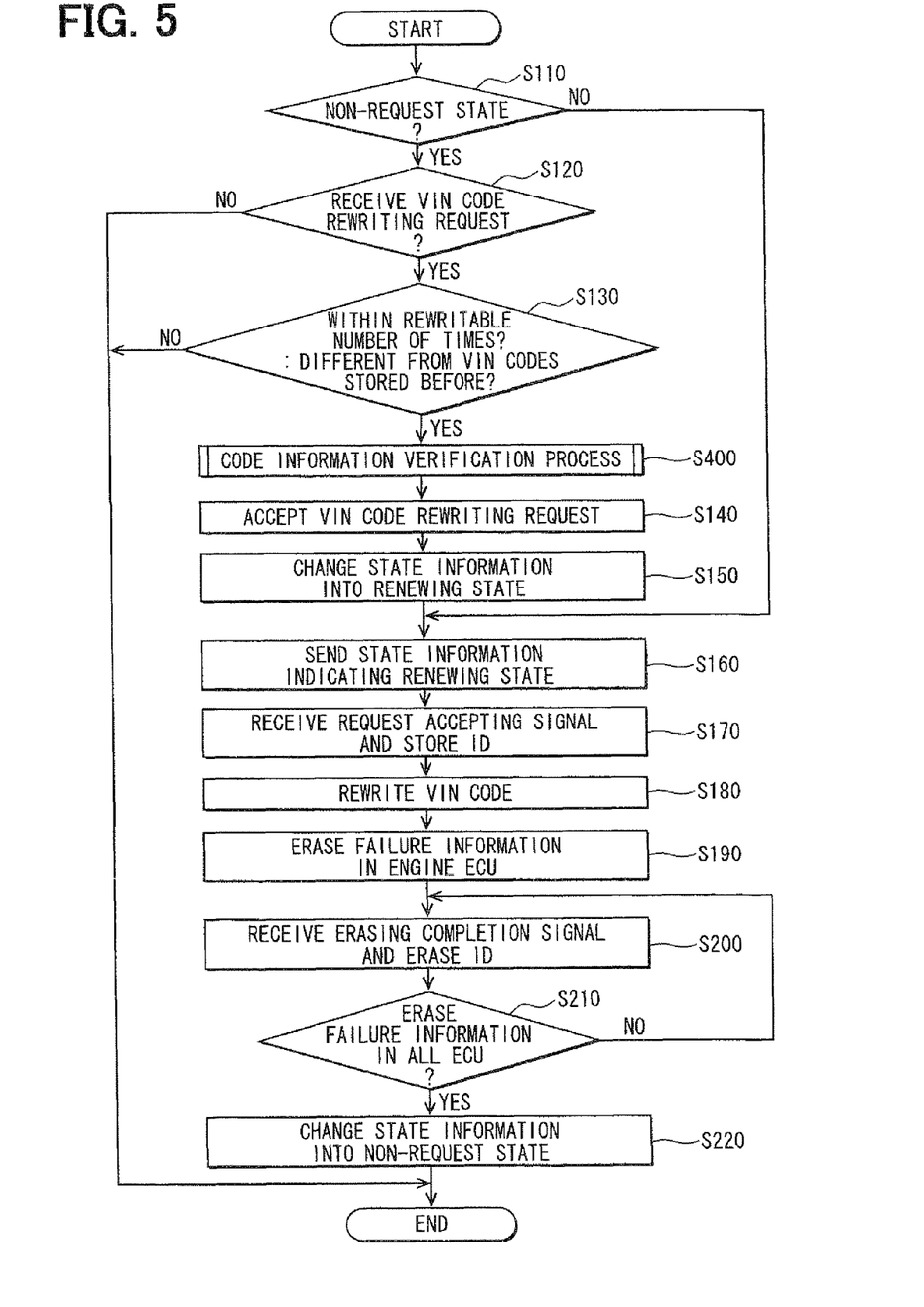
FIG. 5 is a flowchart illustrating an exemplary process performed by an engine ECU according to a second embodiment of the present invention.

In a second embodiment of the present invention, the CPU 36 of the microcomputer 31 performs a process illustrated in FIG. 5. In the process illustrated in FIG. 5, a process at S400 is added compared with the process illustrated in FIG. 3. Thus, only a part different from the first embodiment will be described below.

If the CPU 36 determines that the present rewriting is within the rewritable number of times and the new VIN code is different from the old VIN codes stored before, which corresponds to YES at S130, the process proceeds to S400. At S400, the CPU 36 executes a code information verification process. The code information verification process performed by the CPU 36 will be described with reference to FIG. 6.

Figure 6:
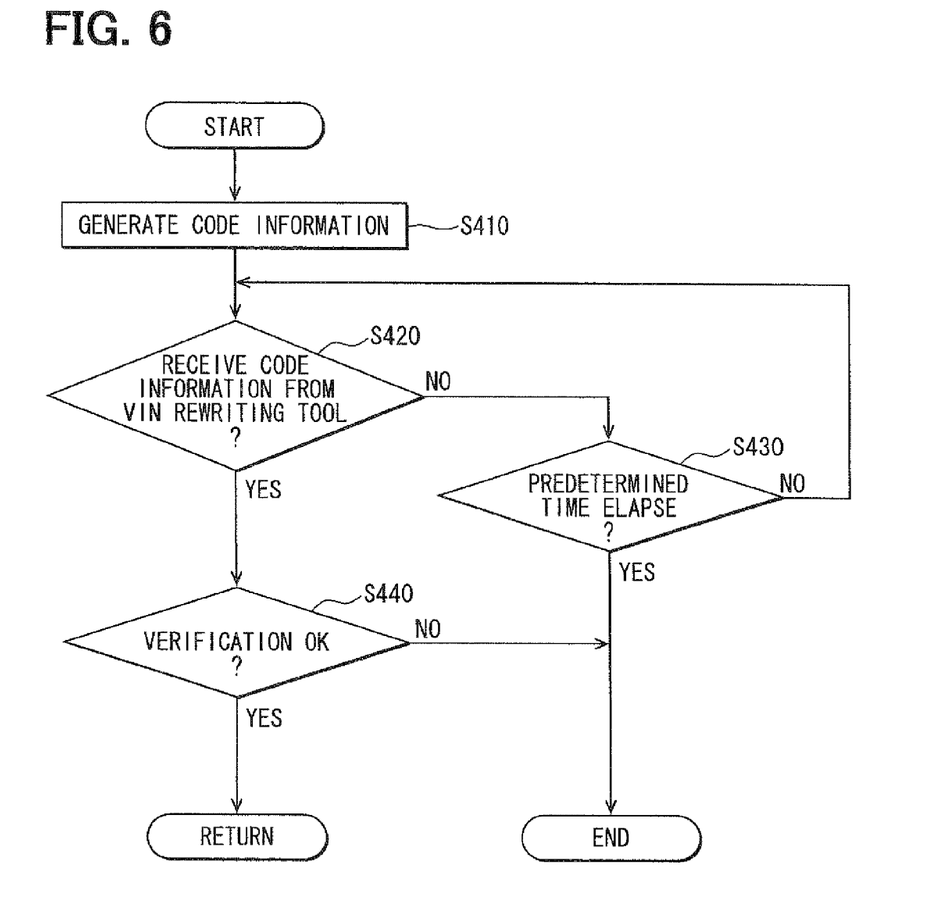
FIG. 6 is a flowchart illustrating exemplary code information verification process performed by the engine ECU according to the second embodiment.

At S410, the CPU 36 generates code information. The CPU 36 reads the VIN code stored at the VIN code storage area having the top address, that is, the VIN code being valid currently. Then, based on the VIN code, the CPU 36 generates the code information unique to the VIN code by a predetermined calculating process. If the VIN codes are different from each other, the code information generated from the VIN codes is different from each other.

At S420, the CPU 36 determines whether the CPU 36 receives code information from the VIN rewriting tool 50. That is, the CPU 36 determines whether the code information is input by a user.

If the CPU 36 determines that the CPU 36 does not receive the code information from the VIN rewriting tool 50, which corresponds to NO at S420, the process proceeds to S430. At S430, the CPU 36 determines whether a predetermined time has elapsed. If the CPU 36 determines that the predetermined time has not elapsed, which corresponds to NO at S430, the process returns to the S420.

If the CPU 36 determines that the predetermined time has elapsed, which corresponds to YES at S430, the process illustrated in FIG. 5 and FIG. 6 ends. If the CPU 36 determines that the CPU 36 receives the code information from the VIN rewriting tool 50, which corresponds to YES at S420, the process proceeds to S440.

At S440, the CPU 36 determines whether the code information generated at S410 corresponds to the code information from the VIN rewriting tool 50. If the CPU 36 determines that the code information generated at S410 does not correspond to the code information from the VIN rewriting tool 50, that is, if verification is not OK, which corresponds to NO at S440, the process illustrated in FIG. 5 and FIG. 6 ends.

If the CPU 36 determines that the code information generated at S410 corresponds to the code information from the VIN rewriting tool 50, that is, if the verification is OK, which corresponds to YES at S440, the process proceeds to S140 in FIG. 5. The process after S140 is described above.

In the present embodiment, if the code information unique to the VIN code stored in the EEPROM 35 does not correspond to the code information input by the user through the VIN rewriting tool 50, which corresponds to NO at S440, the CPU 36 can not execute the rewriting of the VIN code, that is, the rewriting of the VIN code is prohibited. If the code information unique to the VIN code stored in the EEPROM 35 corresponds to the code information input by the user through the VIN rewriting tool 50, which corresponds to YES at S440, the CPU 36 can rewrite the VIN code stored in the EEPROM 35 into the new VIN code.

In the present configuration, if a person trying to rewrite the VIN code does not know the code information unique to the VIN code stored in the EEPROM 35, the person can not rewrite. Thus, the vehicle control system 1 according to the present embodiment can prevent that the VIN code is rewritten dishonestly. In addition, the vehicle control system 1 can prevent that the failure information is erased dishonestly.

In the present embodiment, the process at S140 corresponds to the code information generating means. The I/O circuit 32 and the I/O part 40 correspond to the input means. The process at S440 corresponds to the verification means. In a case where the verification at S440 is not OK, the process ends. Such process corresponds to the rewriting prohibiting means.

Other Embodiments

Although the present invention has been fully described in connection with the exemplary embodiments thereof with reference to the accompanying drawings, it is to be noted that various changes and modifications will become apparent to those skilled in the art.

For example, when the microcomputer 31 receives the VIN code rewriting request at S140, the microcomputer 31 may store the ID of the engine ECU 30 in the accepting state storage area in the RAM 38 and may erase the ID of the engine ECU 30 stored in the accepting state storage area when the erasing of the failure information in the engine ECU 30 is completed at S190. In such a case, the CPU 36 may determine whether the failure information in the engine ECU 30 is erased based on a determination of whether the ID of the engine ECU 30 is stored in the accepting state storage area.

It should be noted that the engine ECU 30 storing the VIN code may be configured to not store the failure information including the emission-related failure information. In such a case, the process at S190 in FIG. 3 and FIG. 5 can be omitted. In addition, during the process at S210, a determination of whether the failure information in all the ECUs is erased is performed for the ECUs other than the engine ECU 30. Thus, the CPU 36 can determine whether the failure information in all the ECUs is erased based on a determination of whether the CPU 36 receives the erasing completion signal from all the ECUs other than the engine ECU 30.

In the above-described embodiments, the emission-related failure information storage area to store emission-related failure information may be changed in order each time the VIN code is rewritten. That is, each time the VIN code is rewritten, a new emission-related failure information storage area may start to store emission-related failure information. Such a process corresponds to the storage area selecting means and the failure information storage control means. In such a process, the emission-related failure is not required to be erased each time the VIN code is rewritten. Thus, a process load and a process time can be reduced.

In the above-described embodiments, the failure information may include the permanent fault code stored in the non-volatile memory. In the above-described embodiment, when the VIN code is rewritten, the old VIN code may be removed from the EEPROM 35. That is, the new VIN code may be written over the old VIN code. Alternatively, a storage area for storing the old VIN code may be provided in the EEPROM 35 or the SRAM 39.

Figure 7:
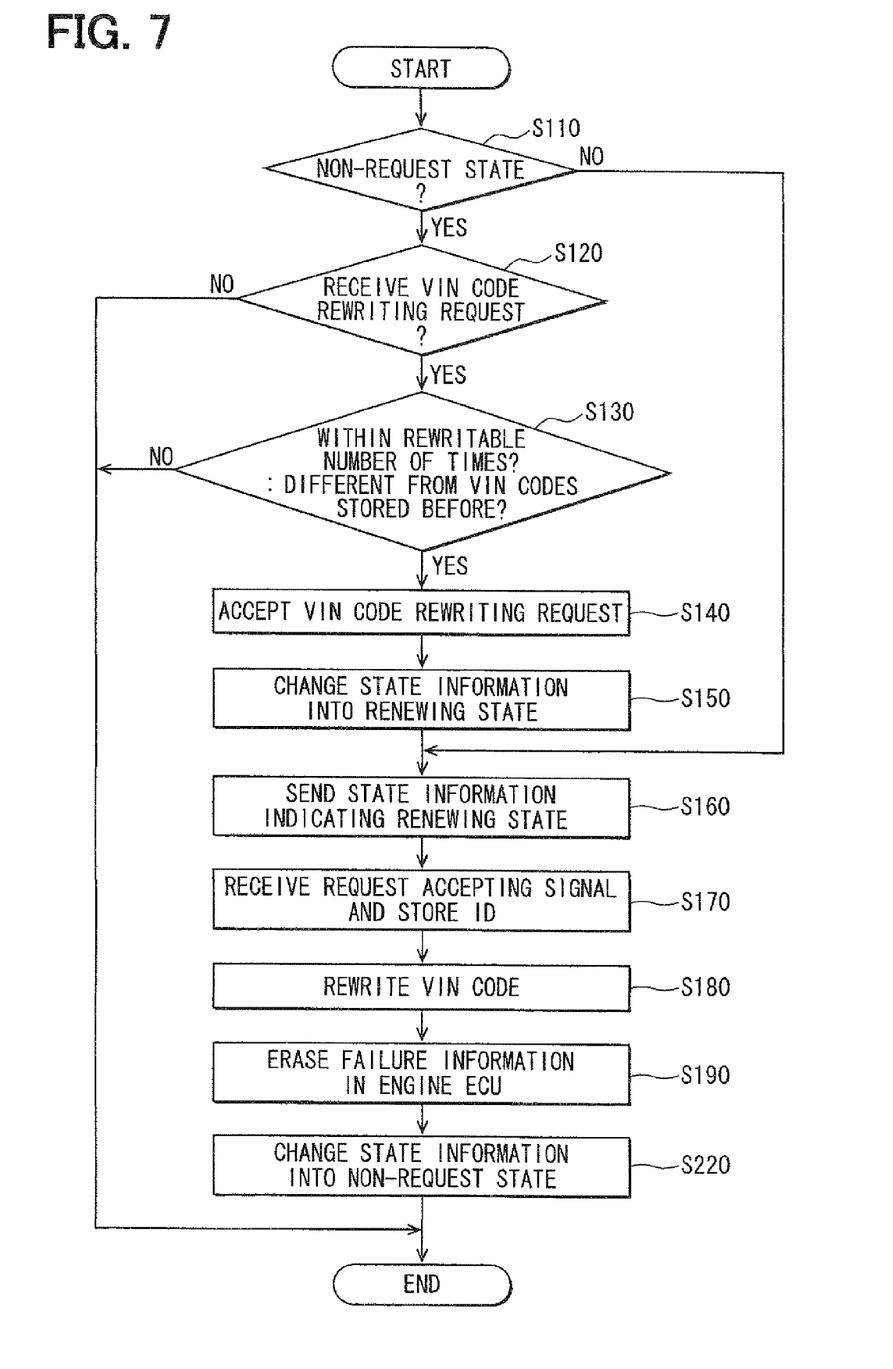
FIG. 7 is a flowchart illustrating an exemplary process performed by an engine ECU according to a modification.

In the above-described embodiments, the process at S200 and S210 may be omitted as illustrated in FIG. 7. That is, if the VIN code is rewritten at S180, the CPU 36 may change the state information indicating the renewing state into the state information indicating the non-request state at S220. In such a case, the process at S220 corresponds to the completion erasing means.

What is claimed is:

1. An electronic control unit provided in a vehicle and configured to be coupled with a peripheral electronic control unit for storing failure information of the vehicle, comprising:
   storing means for storing vehicle identification information unique to the vehicle;
   rewriting means for rewriting the vehicle identification information into new vehicle identification information when the rewriting means receive a rewriting request of the vehicle identification information;
   a memory configured to store data regardless of an on-off state of a power source of the electronic control unit;
   state information control means for writing state information in the memory, the state information indicating a state of rewriting the vehicle identification information, the state information including renewing information and non-request information, the renewing information indicating a state where the vehicle identification information is being rewritten, the non-request information indicating a state where the vehicle identification information is not being rewritten;
   erasing order sending means for sending an erasing order to the peripheral electronic control unit when the state information stored in the memory is the renewing information so as to control the peripheral electronic control unit to erase the failure information;
   determining means for determining whether the peripheral electronic control unit sends an erasing completion signal indicating that the erasing of the failure information in the peripheral electronic control unit is completed, wherein:
   the state information control means writes the renewing information in the memory when the rewriting means receives the rewriting request; and
   the state information control means includes renewing means for rewriting the renewing information into the non-request information when the rewriting means completes the rewriting of the vehicle identification information and the determining means determines that the peripheral electronic control unit sends the erasing completion signal.

2. The electronic control unit according to claim 1, further comprising
   failure information storing means for storing the failure information, the failure information storing means erasing the failure information stored therein when the state information stored in the memory is the renewing information, wherein:
   the determining means further determines whether the failure information stored in the failure information storing means is erased when the state information stored in the memory is the renewing information; and
   the renewing means rewrites the renewing information into the non-request information when the determining means determines that the peripheral electronic control unit sends the erasing completion signal and the failure information stored in the failure information storing means is erased in a state where the rewriting means completes the rewriting of the vehicle identification information.

3. The electronic control unit according to claim 1, wherein the state information control means further includes another renewing means for rewriting the renewing information into the non-request information when the rewriting means completes the rewriting of the vehicle identification information regardless of a determination result of the determining means.

4. The electronic control unit according to claim 1, further comprising:
   history storing means for storing a history of the vehicle identification information stored in the storing means;
   history determining means for determining whether vehicle identification information same as the new vehicle identification information is stored in the history storing means; and
   prohibiting means for prohibiting the rewriting means from rewriting the vehicle identification information stored in the storing means into the new vehicle identification information when the history determining means determines that vehicle identification information same as the new vehicle identification information is stored in the history storing means.

5. The electronic control unit according to claim 1, wherein the rewriting means is capable of rewriting the vehicle identification information a predetermined number of times,
   the electronic control unit further comprising:
   failure information storing means including a plurality of storage areas for storing the failure information, the number of the storage areas being same as the predetermined number;
   storage area selecting means for selecting one of the storage areas in order each time the rewriting means rewrites the vehicle identification information; and
   failure information storage control means for writing the failure information in the storage area selected by the storage area selecting means.

6. The electronic control unit according to claim 1, further comprising:
   code information generating means for generating code information unique to the vehicle identification information from the vehicle identification information stored in the storing means by a predetermined calculating process;
   input means for inputting information based on an operation by a user;
   verification means for determining whether the code information generated from the vehicle identification information corresponds to the information input by the user through the input means; and
   rewriting prohibiting means for prohibiting the rewriting means from rewriting the vehicle identification information into the new vehicle identification information when the verification means determines that the code information generated from the vehicle identification information is different from the information input through the input means.

7. A vehicle control system provided in a vehicle, comprising:
   a first electronic control unit; and
   a second electronic control unit configured to store failure information of the vehicle and coupled with the first electronic control unit, wherein
   the first electronic control unit includes:
   storing means for storing vehicle identification information unique to the vehicle;
   rewriting means for rewriting the vehicle identification information into new vehicle identification information when the rewriting means receive a rewriting request of the vehicle identification information;
   a memory configured to store data regardless of an on-off state of a power source of the first electronic control unit;

state information control means for writing state information in the memory, the state information indicating a state of rewriting the vehicle identification information, the state information including renewing information and non-request information, the renewing information indicating a state where the vehicle identification information is being rewritten, the non-request information indicating a state where the vehicle identification information is not being rewritten;

erasing order sending means for sending an erasing order to the second electronic control unit when the state information stored in the memory is the renewing information so as to control the second electronic control unit to erase the failure information; and determining means for determining whether the second electronic control unit sends an erasing completion signal indicating that the erasing of the failure information in the second electronic control unit is completed, the state information control means writes the renewing information in the memory when the rewriting means receives the rewriting request, and the state information control means includes renewing means for rewriting the renewing information into the non-request information when the rewriting means completes the rewriting of the vehicle identification information and the determining means determines that the second electronic control unit sends the erasing completion signal.

8. The vehicle control system according to claim 7, wherein:
the first electronic control unit further includes failure information storing means for storing the failure information;
the failure information storing means configured to erase the failure information when the state information stored in the memory is the renewing information;
the determining means further determines whether the failure information stored in the failure information storing means is erased when the state information stored in the memory is the renewing information; and
the renewing means rewrites the renewing information into the non-request information when the determining means determines that the second electronic control unit sends the erasing completion signal and the failure information stored in the failure information storing means is erased in a state where the rewriting means completes the rewriting of the vehicle identification information.

9. The vehicle control system according to claim 7, wherein
the state information control means further includes another renewing means for rewriting the renewing information into the non-request information when the rewriting means completes the rewriting of the vehicle identification information regardless of a determination result of the determining means.

10. The vehicle control system according to claim 7, wherein the first electronic control unit further includes:
history storing means for storing a history of the vehicle identification information stored in the storing means;
history determining means for determining whether vehicle identification information same as the new vehicle identification information is stored in the history storing means; and
prohibiting means for prohibiting the rewriting means from rewriting the vehicle identification information stored in the storing means into the new vehicle identification information when the history determining means determines that vehicle identification information same as the new vehicle identification information is stored in the history storing means.

11. The vehicle control system according to claim 7, wherein
the rewriting means is capable of rewriting the vehicle identification information a predetermined number of times, and
the first electronic control unit further includes:
failure information storing means including a plurality of storage areas for storing the failure information, the number of the storage areas being same as the predetermined number;
storage area selecting means for selecting one of the storage areas in order each time the rewriting means rewrites the vehicle identification information; and
failure information storage control means for writing the failure information in the storage area selected by the storage area selecting means.

12. The vehicle control system according to claim 7, wherein the first electronic control unit further includes:
code information generating means for generating code information unique to the vehicle identification information from the vehicle identification information stored in the storing means by a predetermined calculating process;
input means for inputting information based on an operation by a user;
verification means for determining whether the code information generated from the vehicle identification information corresponds to the information input by the user through the input means; and
rewriting prohibiting means for prohibiting the rewriting means from rewriting the vehicle identification information into the new vehicle identification information when the verification means determines that the code information generated from the vehicle identification information is different from the information input through the input means.

13. An electronic control unit provided in a vehicle, comprising:
storing means for storing vehicle identification information unique to the vehicle;
failure information storing means for storing failure information of the vehicle;
rewriting means for rewriting the vehicle identification information into new vehicle identification information when the rewriting means receives a rewriting request of the vehicle identification information;
erasing means for erasing the failure information in the failure information storing means when the rewriting means rewrites the vehicle identification information;
history storing means for storing a history of the vehicle identification information stored in the storing means;
history determining means for determining whether vehicle identification information same as the new vehicle identification information is stored in the history storing means; and
prohibiting means for prohibiting the rewriting means from rewriting the vehicle identification information stored in the storing means into the new vehicle identification information when the history determining means determines that vehicle identification information same as the new vehicle identification information is stored in the history storing means.

14. The electronic control unit according to claim 13 coupled with a peripheral electronic control unit for storing the failure information, the electronic control unit further comprising
 erasing order sending means for sending an erasing order to the peripheral electronic control unit when the rewriting means rewrites the vehicle identification information so as to control the peripheral electronic control unit to erase the failure information.

15. The electronic control unit according to claim 13, wherein:
 the rewriting means is capable of rewriting the vehicle identification information a predetermined number of times;
 the failure information storing means includes a plurality of storage areas for storing the failure information; and
 the number of the storage areas is same as the predetermined number,
 the electronic control unit further comprising:
  storage area selecting means for selecting one of the storage areas in order each time the rewriting means rewrites the vehicle identification information; and
  failure information storage control means for writing the failure information in the storage area selected by the storage area selecting means.

16. The electronic control unit according to claim 13, further comprising:
 code information generating means for generating code information to the vehicle identification information from the vehicle identification information stored in the storing means by a predetermined calculating process;
 input means for inputting information based on an operation by a user;
 verification means for determining whether the code information generated from the vehicle identification information corresponds to the information input by the user through the input means; and
 rewriting prohibiting means for prohibiting the rewriting means from rewriting the vehicle identification information into the new vehicle identification information when the verification means determines that the code information generated from the vehicle identification information is different from the information input through the input means.

17. An electronic control unit provided in a vehicle and configured to be coupled with a peripheral electronic control unit for storing failure information of the vehicle, comprising:
 storing means for storing vehicle identification information unique to the vehicle;
 rewriting means for rewriting the vehicle identification information into new vehicle identification information when the rewriting means receive a rewriting request of the vehicle identification information;
 a memory configured to store data regardless of an on-off state of a power source of the electronic control unit;
 state information control means for writing state information in the memory, the state information indicating a state of rewriting the vehicle identification information;
 erasing order sending means for sending an erasing order to the peripheral electronic control unit when the state info nation stored in the memory indicates a rewriting state so as to control the peripheral electronic control unit to erase the failure information;
 determining means for determining whether the peripheral electronic control unit sends an erasing completion signal indicating that the erasing of the failure information in the peripheral electronic control unit is completed, wherein:
 the state information control means writes the state information indicating the rewriting state in the memory when the rewriting means receives the rewriting request;
 the state information control means includes determination erasing means for erasing the state information indicating the rewriting state when the rewriting means completes the rewriting of the vehicle identification information and the determining means determines that the peripheral electronic control unit sends the erasing completion signal;
 the electronic control unit further comprises failure information storing means for storing the failure information, the failure information storing means erasing the failure information stored therein when the state information stored in the memory indicates the rewriting state;
 the determining means further determines whether the failure information stored in the failure information storing means is erased when the state information stored in the memory indicates the rewriting state; and
 the determination erasing means erases the state information indicating the rewriting state when the determining means determines that the peripheral electronic control unit sends the erasing completion signal and the failure information stored in the failure information storing means is erased in a state where the rewriting means completes the rewriting of the vehicle identification information.

18. The electronic control unit according to claim 17, wherein
 the state information control means further includes completion erasing means for erasing the state information indicating the rewriting state when the rewriting means completes the rewriting of the vehicle identification information regardless of a determination result of the determining means.

19. The electronic control unit according to claim 17, further comprising:
 history storing means for storing a history of the vehicle identification information stored in the storing means;
 history determining means for determining whether vehicle identification information same as the new vehicle identification information is stored in the history storing means; and
 prohibiting means for prohibiting the rewriting means from rewriting the vehicle identification information stored in the storing means into the new vehicle identification information when the history determining means determines that vehicle identification information same as the new vehicle identification information is stored in the history storing means.

20. The electronic control unit according to claim 17, wherein
 the rewriting means is capable of rewriting the vehicle identification information a predetermined number of times,
 the electronic control unit further comprising:
  failure information storing means including a plurality of storage areas for storing the failure information, the number of the storage areas being same as the predetermined number;
  storage area selecting means for selecting one of the storage areas in order each time the rewriting means rewrites the vehicle identification information; and
  failure information storage control means for writing the failure information in the storage area selected by the storage area selecting means.

21. The electronic control unit according to claim 17, further comprising:
 code information generating means for generating code information unique to the vehicle identification information from the vehicle identification information stored in the storing means by a predetermined calculating process;

input means for inputting information based on an operation by a user;

verification means for determining whether the code information generated from the vehicle identification information corresponds to the information input by the user through the input means; and rewriting prohibiting means for prohibiting the rewriting means from rewriting the vehicle identification information into the new vehicle identification information when the verification means determines that the code information generated from the vehicle identification information is different from the information input through the input means.

22. A vehicle control system provided in a vehicle, comprising:

a first electronic control unit; and a second electronic control unit configured to store failure information of the vehicle and coupled with the first electronic control unit, wherein the first electronic control unit includes:

storing means for storing vehicle identification information unique to the vehicle;

rewriting means for rewriting the vehicle identification information into new vehicle identification information when the rewriting means receive a rewriting request of the vehicle identification information;

a memory configured to store data regardless of an on-off state of a power source of the first electronic control unit;

state information control means for writing state information in the memory, the state information indicating a state of rewriting the vehicle identification information;

erasing order sending means for sending an erasing order to the second electronic control unit when the state information stored in the memory indicates a rewriting state so as to control the second electronic control unit to erase the failure information; and determining means for determining whether the second electronic control unit sends an erasing completion signal indicating that the erasing of the failure information in the second electronic control unit is completed, wherein:

the state information control means writes the state information indicating the rewriting state in the memory when the rewriting means receives the rewriting request, and the state information control means includes determination erasing means for erasing the state information indicating the rewriting state when the rewriting means completes the rewriting of the vehicle identification information and the determining means determines that the second electronic control unit sends the erasing completion signal;

the first electronic control unit further includes failure information storing means for storing the failure information;

the failure information storing means configured to erase the failure information when the state information stored in the memory indicates the rewriting state;

the determining means further determines whether the failure information stored in the failure information storing means is erased when the state information stored in the memory indicates the rewriting state; and the determination erasing means erases the state information indicating the rewriting state when the determining means determines that the second electronic control unit sends the erasing completion signal and the failure information stored in the failure information storing means is erased in a state where the rewriting means completes the rewriting of the vehicle identification information.

23. The vehicle control system according to claim 22, wherein the state information control means further includes completion erasing means for erasing the state information indicating the rewriting state when the rewriting means completes the rewriting of the vehicle identification information regardless of a determination result of the determining means.

24. The vehicle control system according to claim 22, wherein the first electronic control unit further includes:

history storing means for storing a history of the vehicle identification information stored in the storing means;

history determining means for determining whether vehicle identification information same as the new vehicle identification information is stored in the history storing means; and prohibiting means for prohibiting the rewriting means from rewriting the vehicle identification information stored in the storing means into the new vehicle identification information when the history determining means determines that vehicle identification information same as the new vehicle identification information is stored in the history storing means.

25. The vehicle control system according to claim 22, wherein the rewriting means is capable of rewriting the vehicle identification information a predetermined number of times, and the first electronic control unit further includes:

failure information storing means including a plurality of storage areas for storing the failure information, the number of the storage areas being same as the predetermined number;

storage area selecting means for selecting one of the storage areas in order each time the rewriting means rewrites the vehicle identification information; and failure information storage control means for writing the failure information in the storage area selected by the storage area selecting means.

26. The vehicle control system according to claim 22, wherein the first electronic control unit further includes:

code information generating means for generating code information unique to the vehicle identification information from the vehicle identification information stored in the storing means by a predetermined calculating process;

input means for inputting information based on an operation by a user;

verification means for determining whether the code information generated from the vehicle identification information corresponds to the information input by the user through the input means; and rewriting prohibiting means for prohibiting the rewriting means from rewriting the vehicle identification information into the new vehicle identification information when the verification means determines that the code information generated from the vehicle identification information is different from the information input through the input means.

* * * * *